Patented Apr. 23, 1929.

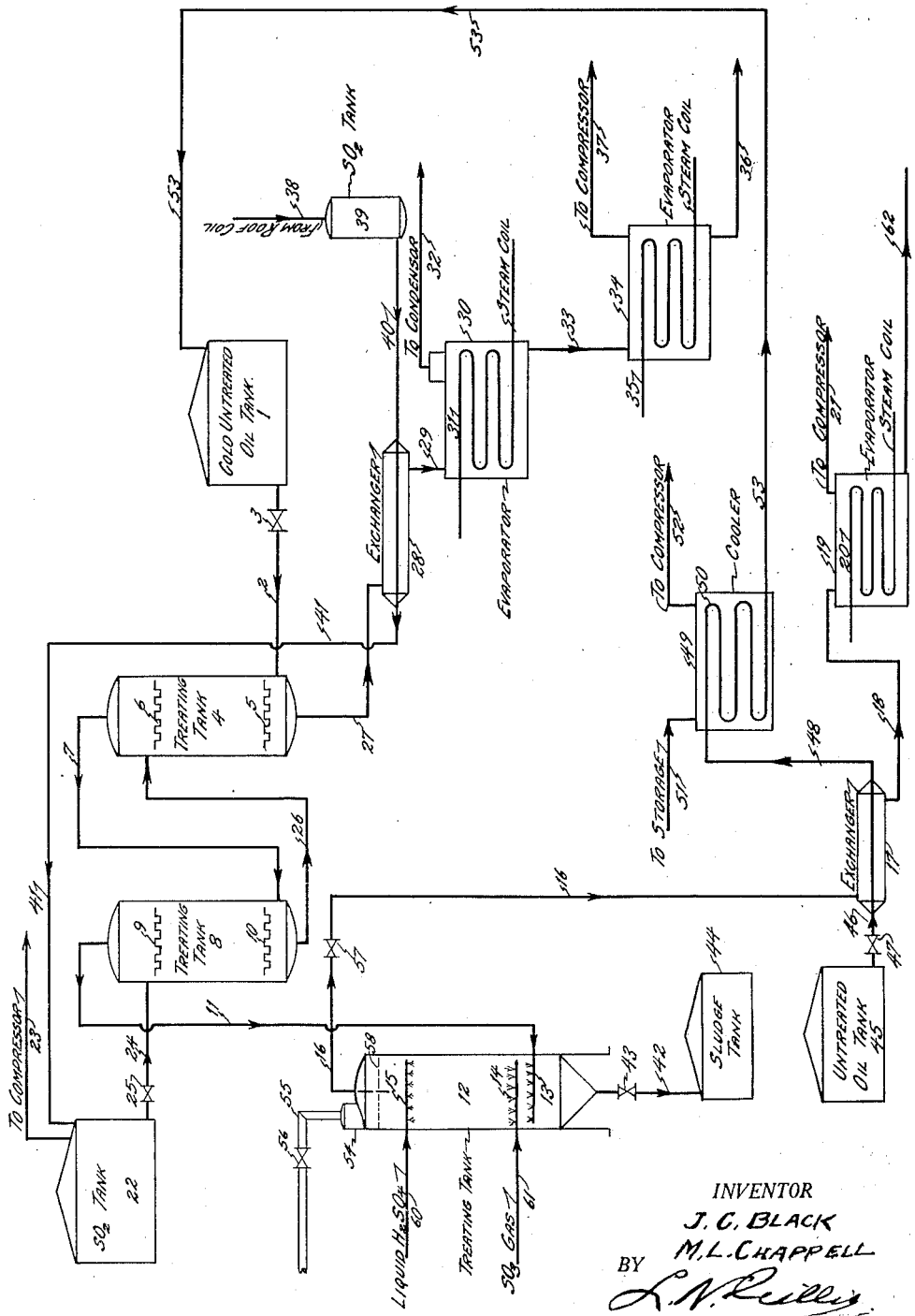

1,710,143

UNITED STATES PATENT OFFICE.

JOHN C. BLACK AND MARVIN L. CHAPPELL, OF LOS ANGELES, CALIFORNIA, ASSIGNORS TO PAN AMERICAN PETROLEUM COMPANY, OF LOS ANGELES, CALIFORNIA, A CORPORATION OF CALIFORNIA.

PROCESS OF TREATING HYDROCARBONS.

Application filed April 6, 1927. Serial No. 181,564.

This invention relates to the purification of hydrocarbons, and while not necessarily thereto, it more specifically refers to the treatment of lamp oil distillates derived from a petroleum oil of the carbocyclic, or asphalt base series.

One of the principal objects of this invention is to accomplish a purification of lamp oil stocks by a sequence of operations, rapidly, economically, and without loss of the desired stock.

Another object of the invention is to provide a continuous system for the extraction of hydrocarbons containing a low percentage of hydrogen and sulphur bearing constituents, from lamp oil distillates containing the same, by a selective treatment of said lamp oil distillate at low temperatures, with liquid sulphur dioxide followed by a treatment with fuming sulphuric acid, or sulphur trioxide gas in the presence of liquid sulphur dioxide.

Another object of the invention is to produce a lamp oil which will burn in any standard lamp, or stove, without a drop in flame, or without producing a disagreeable odor or smoke.

By well known methods in the treating of lamp oil distillates derived from an asphalt or mixed base crude petroleum oil, it is usually necessary to employ large amounts of fuming sulphuric acid at elevated temperatures, or sulphur trioxide gas at normal temperatures, to extract therefrom the sulphur bearing hydrocarbons and hydrocarbons containing a high percentage of carbon, such for example as hydrocarbons of the unsaturated and aromatic series, having the general formula of, $C_nH_{2n-2}$, $C_nH_{2n-4}$, and $C_nH_{2n-6}$.

Another well known method for the purification of lamp oil distillates derived from an asphalt or mixed base crude petroleum oil is the liquid sulphur dioxide method in which lamp oil distillates are commingled with liquid sulphur dioxide at low temperatures, permitted to settle, and the liquid sulphur dioxide containing the extracted oil separated. This method, however, does not completely purify the lamp oil distillates, which must be further treated with sulphuric acid at elevated or normal temperatures to obtain the desired color and grade. Also this method involves considerable loss of the desired stock due to the inability of the liquid sulphur dioxide to make a complete separation of the desired hydrocarbons from the undesired hydrocarbons, whereby a part of the undesired hydrocarbons is left in the treated lamp oil distillates, and a part of the desired hydrocarbons is left in the extracted undesired hydrocarbons.

On certain lamp oil distillates derived from a California asphalt or mixed base crude petroleum oil it was determined that by the above well known methods of either treating with fuming sulphuric acid at elevated temperatures, or treating with liquid sulphur dioxide at low temperatures, followed by a treatment with sulphuric acid at normal or elevated temperatures, a yield of finished high grade lamp oil could not be obtained without a loss of from 25 to 30% of the distillate treated, while by our improved method a finished yield of the same grade of lamp oil was obtained with a loss of only 20 to 25% of the distillate treated, thereby making a saving of approximately 5% of the distillate treated, which has heretofore been lost or rendered unuseable for lamp oil stock.

By our invention lamp oil distillate derived from an asphalt or mixed base crude petroleum oil is first treated with liquid sulphur dioxide at a temperature below 32° F., preferably 17° F., in quantities just sufficient to extract the major portion of the undesired hydrocarbons without any substantial extraction of the desired hydrocarbons, after which the partly purified lamp oil distillates containing dissolved liquid sulphur dioxide is separated from the surplus liquid sulphur dioxide containing the extracted undesired hydrocarbons, and then treated with sulphur trioxide or fuming sulphuric acid, in quantities sufficient to complete the purification, the acid treatment of said partly purified lamp oil distillate being performed at temperatures below 32° F. and in the presence of dissolved liquid sulphur dioxide, whereby a selective treatment is obtained without the extraction or chemical destruction of substantially any of the desired lamp oil stock.

From the foregoing preliminary explanation it will be understood that our invention consists in the purification of lamp oil distillate, first by extracting a part of the undesired hydrocarbons with liquid sulphur dioxide at low temperatures, and then immediately finishing the purification completely at substantially the same low temperature, in the presence of dissolved liquid sulphur dioxide, by the employment of sulphur trioxide or fuming sulphuric acid, whereby in the first treatment excessive extraction of the desired hydrocarbons is prevented, and in the second treatment excessive sulphonation and oxidation of the desired lamp oil stock is prevented.

The preferred embodiment of our invention will now be explained by reference to the accompanying drawing which is a diagrammatical representation of a preferred apparatus for carrying out the operations of the present invention.

In the drawing, 45 represents generally an oil tank containing the lamp oil distillate to be treated. Pipe 46, controlled by valve 47, is connected to said tank 45 and leads through a heat exchanger 17. Pipe 48 connects heat exchanger 17 to the coil 50 in the cooler 49. Cooler 49 is provided with a pipe 52 which leads to a compressor, not shown. A pipe 51 is connected to the cooler 49 and leads from a source of liquid sulphur dioxide, not shown. A pipe 53 connects the said coil 50 to oil tank 1. Pipe 2, controlled by a valve 3, connects oil tank 1 to treating tank 4. Treating tank 4 is provided with distributing plates 5 and 6. A pipe 26 connects the treating tank 4 at the top to the bottom of a treating tank 8, which is also provided with distributing plates 9 and 10. The said treating tank 8 is in turn connected at the top to a third treating tank 12 by a pipe 11. The said pipe 11, on entering the third treating tank 12, is provided with spray nozzles or jets 13. A pipe 60 enters the top of said treating tank 12, and is also provided with spray jets or nozzle 15, this pipe 60 leading to a source of liquid sulphuric acid, not shown. A pipe 61 enters the said treating tank 12 at the bottom, and in like manner is provided with nozzles or spray jets 14, this said pipe 61 leading to a source of sulphur trioxide, not shown. A pipe 42, controlled by a valve 43, connects the treating tank 12 at the bottom to a sludge tank 44.

A tank 22 is provided for the storage of liquid sulphur dioxide, which is connected at the top by a pipe 23, which leads to a compressor, not shown. Pipe 41 is also connected to the said tank 22 and leads from an exchanger 28. A pipe 24, controlled by a valve 25, is also connected to the tank 22 at the bottom and leads to the treating tank 8 at the top. A pipe 40 connects the exchanger 28 to a sulphur dioxide storage tank 39. Pipe 38 connects the sulphur dioxide storage tank 39 at the top to a cooling coil, not shown, where liquid sulphur dioxide is condensed.

The treating tank 4 is connected at the bottom by a pipe 27 to the heat exchanger 28. A pipe 29 connects the said exchanger 28 to an evaporator 30. The evaporator 30 is provided with a steam coil 31, for converting the liquid sulphur dioxide into a gas. The evaporator 30 is also provided with a pipe 32 which leads to a compressor, not shown. A pipe 33 connects the evaporator 30 at the bottom to a second evaporator 34, which is also provided with a steam coil 35, by means of which the extracted oil may be further heated to liberate completely all the liquid sulphur dioxide contained therein. The said evaporator 34 is also provided with a pipe 37, connected at the top, which leads to the suction side of a compressor, not shown. A pipe 36 connects the evaporator 34 at the bottom to a source of storage, not shown.

A pipe 7 connects the treating tank 4 at the top to the bottom of the treating tank 8. A pipe 16, controlled by the valve 57, extends below the liquid level 58 in treating tank 12, and connects the treating tank 12 to heat exchanger 17. A vapor dome 54 is placed on the top of treating tank 12. A vapor line 55, controlled by a valve 56, is connected to the vapor dome 54 to lead away the waste vapors. A pipe 18 connects the said heat exchanger 17 to an evaporator 19, this evaporator being provided with a steam coil 20 for heating the treated oil up to a temperature where it will liberate all the sulphur dioxide dissolved therein. The evaporator 19 is provided with a pipe 62 connected at the bottom, which leads to a source of storage for the finished treated oil, which may be further treated with a neutralizing agent. The evaporator 19 is also provided with pipe 21 which leads to a compressor, not shown.

The preferred process as carried out in the apparatus described is as follows:

Lamp oil distillate, preferably that derived from an asphalt or mixed base crude petroleum oil, contained in the tank 45 is caused to flow under pressure through the exchanger 17, controlled by valve 47, where a temperature exchange takes place with the outgoing treated oil coming from the acid treating tank 12. In this exchange of temperature the lamp oil distillate is cooled approximately 20 to 40° F. From the exchanger 17 the lamp oil distillate passes through a pipe coil 50, contained in the cooler 49, and is further cooled to approximately 17° F. by means of the cooling liquid in the cooler 49. This cooling liquid is preferably liquid sulphur dioxide, and is introduced into the cooler 49 through the pipe 51, which leads to a source of liquid sulphur dioxide not shown. By taking suction on the cooler 49 through the pipe 52, which leads to a compressor, not shown, the temperature of the liquid sulphur dioxide contained in the cooler 49 may be lowered to the temperature necessary to cool the untreated lamp oil distillate passing through the coil 50 to approximately 17° F.

The vaporized sulphur dioxide produced in the cooling of the lamp oil distillate passes through pipe 52 to a compressor, not shown, where the same is compressed, cooled, condensed to a liquid, and returned to the sulphur dioxide storage tank 39, through the pipe 38.

The cooled lamp oil distillate passes from the said cooler 49 through the pipe 53 and into a tank 1. From tank 1 the cooled oil passes through the pipe 2, controlled by a valve 3, and into the treating tank 4. In the treating tank 4 the cooled lamp oil distillate passes through a distributor plate 5 and upward in counter-flow to streams of used sulphur dioxide coming from the treating tank 8 through the pipe 26. During the passage of the lamp oil distillate through treating tank 4 a part of the undesired hydrocarbons is extracted by coming into contact with the once used sulphur dioxide. From treating tank 4 the partly treated cold lamp oil distillate passes from the pipe 7 into a second treating tank 8 through the distributor plate 10 and upward in counter-flow treatment to streams of liquid sulphur dioxide at low temperatures, where in like manner another portion of the undesired hydrocarbons is extracted. The cold partly purified lamp oil distillate passes from treating tank 8 through the pipe 11, and into the acid treating tank 12, and is therein treated with fuming sulphuric acid or sulphur trioxide, in quantities sufficient to extract the balance of the undesired hydrocarbons present, with the formation of sulpho-acids or sludge. The sulpho-acids or sludge formed by this said acid treatment is withdrawn into the sludge tank 44, and the cold purified lamp oil distillate passes from the pipe 16 through the exchanger 17, and then into an evaporator 19 where the dissolved sulphur dioxide is separated from the said lamp oil distillate by heating under a partial vacuum, the liberated sulphur dioxide passing to a compressor, not shown, where the same is liquefied, and returned to the storage tank 39.

The treated lamp oil distillate now free of undesirable hydrocarbons is conveyed through the pipe 61 to a storage, not shown, and finished by processes well known in the art, which may be neutralization with caustic soda, or a re-distillation followed by a light treatment with sulphuric acid, and a final caustic soda neutralization. With a lamp oil distillate which has been efficiently separated from the higher boiling hydrocarbons a re-distillation and acid treatment is unnecessary.

The acid treatment of the lamp oil distillate after the liquid sulphur dioxide extraction operation, as heretofore stated, may be carried out with the employment of fuming sulphuric acid, preferably one containing more than 15% sulphur trioxide, or with sulphur trioxide, preferably the sulphur trioxide containing gas produced by the well known contact process, which contains approximately 3 to 8% by volume sulphur trioxide, in which case the sulphur trioxide bearing gas would be continuously introduced into the treating tank 12 in sufficient quantities to complete the purification through the spray nozzles 14, which are connected to the pipe 61, the said pipe 61 leading to a source of sulphur trioxide bearing gas. In case fuming sulphuric acid is employed for the final purification of the lamp oil distillate, the said acid is introduced through the spray nozzles 15, coming through the pipe 60 from a source, not shown, and passing in counter-flow to the upcoming cold sulphur dioxide treated lamp oil distillate.

The sulpho-acids or sludge produced by either the employment of sulphur trioxide bearing gas or fuming sulphuric acid is continuously, or intermittently drawn into sludge tank 44, controlled by the valve 43.

The quantity of sulphuric acid employed in this operation may range from as low as one-tenth of a pound to as high as one pound per gallon of oil treated, this depending upon the quality of the stock to be treated and the product desired, and in like case the quantity of liquid sulphur dioxide required to remove the major portion of undesired hydrocarbons may vary from as low as one-fourth volume to as high as one and one-fourth volumes of liquid sulphur dioxide per gallon of lamp oil distillate to be treated.

The liquid sulphur dioxide contained in the storage tank 39 is continuously passed, in the required amounts, through the pipe 40 and then through exchanger 28 where the temperature is reduced approximately 20 to 40° F., by a counter-flow heat exchange from the outgoing cold used sulphur dioxide. From the exchanger 28 the liquid sulphur dioxide passes through the pipe 41 and into the tank 22 where the temperature is further reduced to approximately 17° F., by causing a portion of the liquid sulphur dioxide to evaporate, the liquid sulphur dioxide vapors passing out of said tank 22 through the pipe 23 which leads to the suction side of a compressor, not shown, where the said sulphur dioxide vapors are compressed, cooled, liquefied, and returned to the storage tank 39.

The cooled liquid sulphur dioxide in tank 22 is continuously passed in the required amount through the pipe 24, controlled by the valve 25, into the treating tank 8 where the same is divided into small streams or droplets by the distributor plate 9 and passes downward in counter-flow treatment with the partly treated lamp oil distillate. The pipe 26 conducts the once used liquid sulphur dioxide from the bottom of treating tank 8 to the top of the treating tank 4, where in like manner the once used liquid sulphur dioxide passes through the distributor plate 6 downward in counter-flow treatment with the untreated lamp oil distillate.

The used cold liquid sulphur dioxide containing the extracted hydrocarbons passes through the pipe 27 and into the exchanger 28, and therein undergoes a heat exchange with the purified liquid sulphur dioxide. From exchanger 28 the used liquid sulphur dioxide passes into an evaporator 30 which is provided with a steam coil 31, by means of which the major portion of the used sulphur dioxide is evaporated and separated from the extracted hydrocarbons, the vaporized sulphur dioxide passing through a condenser, not shown, under sufficient pressure to liquefy the same, from where the liquefied sulphur dioxide is returned to the tank 39.

The heated extracted hydrocarbons contained in the evaporator 30 are continuously passed through the pipe 33 into a second evaporator 34, where the said extracted hydrocarbons are further heated by means of steam coil 35, and under a partial vacuum maintained on said evaporator 34, sufficient to expel the balance of the dissolved sulphur dioxide, which passes off as a gas through the suction pipe 37 to a compressor, not shown, and is compressed, cooled, liquefied, and returned to the sulphur dioxide storage tank 39.

In case a sulphur trioxide bearing gas is employed in the final purification of the lamp oil distillate, preferably a gas containing approximately 6% sulphur trioxide is employed, and enters the treating tank 12 through the spray nozzles 14, passing up through the sulphur dioxide treated oil in treating tank 12. The inert gases consisting principally of nitrogen, oxygen, and sulphur dioxide pass out of the treating tank 12 through the dome 54 and pipe 55 controlled by valve 56. These said inert gases passing out of treating tank 12 through the pipe 55 carry a relatively large percentage of sulphur dioxide, which was dissolved in the sulphur dioxide treated oil. This sulphur dioxide may be recovered by well known compression and cooling methods.

While the process herein described is well adapted for purifying lamp oil distillate, it is to be understood that lubricating oil stocks and distillates suitable for the manufacture of liquid petrolatum may also be purified by this invention and that various modifications may be made without departing from the invention and the invention includes all such modifications and changes as come within the scope of the appended claims.

We claim:

1. The process of purifying hydrocarbon oils, which consists in treating the same with liquefied sulphur dioxide, in quantities just sufficient to dissolve a portion of the constituents to be separated; dissolving constituents of the same therein; separating the two liquids, and then treating the partly purified hydrocarbon oil at temperatures below 32° F. with fuming sulphuric acid, and in the presence of dissolved sulphur dioxide, in quantities sufficient to convert the balance of the constituents to be separated into sulpho-acids, and then separating the purified hydrocarbon oil from the sulphur dioxide and sulpho-acids.

2. The process of purifying hydrocarbon oils, which consists in treating the same with liquid sulphur dioxide in quantities sufficient to dissolve a portion of the constituents to be separated, dissolving that portion of the constituents to be separated therein, separating the two liquids and then treating the partly purified hydrocarbon oil at temperatures below 32° F. by a counterflow treatment with fuming sulphuric acid in the presence of dissolved sulphur dioxide, in quantities sufficient to convert the balance of the constituents to be separated into sulpho-acids, and then separating the purified hydrocarbon oil from the sulphur dioxide and sulpho-acids.

3. The process of purifying hydrocarbon oils, which consists in treating the same with liquid sulphur dioxide in quantities sufficient to dissolve a portion of the constituents to be separated, dissolving constituents of the same therein, separating the two liquids and then treating the partly purified hydrocarbon oils at temperatures below 32° F. with fuming sulphuric acid in the presence of dissolved sulphur dioxide, in quantities sufficient to convert the balance of the constituents to be separated into sulpho-acids, separating the purified hydrocarbons containing dissolved sulphur dioxide from the sulpho-acids, and separating the dissolved sulphur dioxide from the purified hydrocarbon oil and the extracted constituents.

4. A continuous process of purifying hydrocarbon oils, which consists in treating the same at temperatures below 32° F., by counter-flow contact with streams of liquid sulphur dioxide, in quantities sufficient to dissolve a part of the hydrocarbons containing a high percentage of carbon, and sulphur bearing hydrocarbons; continuously dissolving the same therein; continuously separating the two liquids, and continuously treating the partly purified hydrocarbon oils at temperatures below 32° F. with fuming sulphuric acid, in the presence of dissolved sulphur dioxide, in quantities sufficient to convert the remaining sulphur bearing hydrocarbons and hydrocarbons having a relatively high percentage of carbon into sulpho-acids without any substantial sulphonation or oxidation of the hydrocarbons having relatively lower percentages of carbon; separating the purified hydrocarbons from the sulpho-acids, and separating the dissolved sulphur dioxide from the purified hydrocarbons and extracted hydrocarbons.

5. A continuous process of purifying hydrocarbon oils, which consists in treating the same at temperatures below 32° F., by counter-flow contact with streams of liquid sulphur dioxide in quantities sufficient to dissolve a part of the hydrocarbons containing a high percentage of carbon, and sulphur bearing hydrocarbons; continuously dissolving the same therein; continuously separating the two liquids, and continuously treating the partly purified hydrocarbon oils at temperatures below 32° F. by a counterflow treatment with fuming sulphuric acid, in the presence of dissolved sulphur dioxide, in quantities sufficient to convert the remaining sulphur bearing hydrocarbons and hydrocarbons having a relatively high percentage of carbon into sulpho-acids without any substantial sulphonation or oxidation of the hydrocarbons having relatively lower percentages of carbon; separating the purified hydrocarbons from the sulpho-acids, and separating the dissolved sulphur dioxide from the purified hydrocarbons and extracted hydrocarbons.

In testimony whereof we affix our signatures.

JOHN C. BLACK.
MARVIN L. CHAPPELL.